United States Patent
Vadura et al.

(10) Patent No.: US 10,057,534 B2
(45) Date of Patent: Aug. 21, 2018

(54) HYBRID MODULAR DEVICE

(71) Applicants: Dennis Vadura, Trabuco Canyon, CA (US); Wei Kang Tsai, Irvine, CA (US); Timothy Hayden Nelson, Orange, CA (US)

(72) Inventors: Dennis Vadura, Trabuco Canyon, CA (US); Wei Kang Tsai, Irvine, CA (US); Timothy Hayden Nelson, Orange, CA (US)

(73) Assignee: Badu Networks, Inc., Irvine, CA (US)

( * ) Notice: Subject to any disclaimer, the term of this patent is extended or adjusted under 35 U.S.C. 154(b) by 172 days.

(21) Appl. No.: 14/634,460

(22) Filed: Feb. 27, 2015

(65) Prior Publication Data

US 2016/0255301 A1 Sep. 1, 2016

(51) Int. Cl.
*H04N 5/64* (2006.01)
*H04N 5/655* (2006.01)

(52) U.S. Cl.
CPC ............... *H04N 5/655* (2013.01); *H04N 5/64* (2013.01)

(58) Field of Classification Search
CPC ................................. H04N 5/655; H04N 5/64
USPC ......................................................... 348/839
See application file for complete search history.

(56) References Cited

U.S. PATENT DOCUMENTS

| 4,281,909 A * | 8/1981 | Ishibashi | G03B 17/02 348/E5.024 |
| 8,525,924 B2 * | 9/2013 | Jannard | H04N 5/2251 348/372 |
| 2004/0259587 A1 * | 12/2004 | Chadha | H04M 1/0254 455/550.1 |
| 2014/0337621 A1 * | 11/2014 | Nakhimov | G06F 1/163 713/168 |
| 2016/0100758 A1 * | 4/2016 | Jeong | G06F 1/1684 340/870.07 |

* cited by examiner

Primary Examiner — Richard Torrente

(57) ABSTRACT

A hybrid modular appliance or electronic device allows a user to plug a number of snap-together component modules of different types into a base device, so that the resulting assembly performs a custom-designed functionality. With no attached component modules, the base device functions as a standalone consumer or office appliance. At least one component module has its functionality not supporting the functionality of the base device, thereby allowing the resulting assembly a hybrid device. Examples of the hybrid modular devices include a TV-Wi-Fi-router, and a TV-storage-DVR-Wi-Fi-router. A hybrid modular device can serve as a videoconference device, a music jukebox, or a home theater unit.

2 Claims, 3 Drawing Sheets

HYBRID MODULAR DEVICE

CROSS REFERENCES TO RELATED APPLICATIONS

The present Application claims priority to U.S. Provisional Patent Application No. 61/946,648, entitled HYBRID MODULAR DEVICE, filed on Feb. 28, 2014, which is hereby incorporated by reference in its entirety.

FIELD OF THE INVENTION

The present invention relates in general to electronic devices, and in particular, to consumer electronic devices that automates, facilitates, or makes convenient the daily activities in a home or small office.

BACKGROUND OF THE INVENTION

Consumer electronic devices are essential for the modern home or small office. The range of application is broad as it includes entertainment, communications, personal productivity, energy management, home safety and security, health and wellness, convenience and automation, etc.

A problem with consumer electronic devices today is the short product life. Invariably, soon after a product has been purchased, a newer and better version of the same product is available in the market. Further, the vendor that manufactured the original product may stop the support or abandon the development of the original product.

Most device makers have adopted the business model of planned obsolescence. Most devices are now designed to last only for a limited useful life. The manufacturer makes sure that, when a device is broken, the repair cost is about the same as the replacement cost of a newer and better device.

Today, a consumer replaces a complete device simply because a "desirable or needed" functionality, which might only be 10% of the overall functionality, is damaged. As the life expectancy of all consumer products has declined steadily, most consumers regularly replace their devices at various frequencies. In the end, consumers pay more for their lifestyle.

A second concern for consumer electronic devices is the lack of customization. As every home or small office is unique in its own way, the requirement for matching equipment varies greatly. However, for volumetric efficiency, device makers offer only a limited choice of features, in the effort to drive down the manufacturing cost. As a result, a consumer often buys a product with redundant or even unwanted features.

On the other hand, customized products are available only at significantly higher prices. The middle-of-the-road solution is modular consumer devices. A modular device is hardware reconfigurable and allows an end user to insert and assemble different hardware modules on a fixed platform, in order that the final assembly performs a customized set of functions.

Possibly, the first modular consumer electronic device is the modular handset planned by Google under the Ara project. With an Ara base platform, a user is allowed to build a wireless communicator with a collection of snap-together parts. For example, a customer who prefers a hard keyboard will be able to add one. Another customer who desires a high-end camera will be able to upgrade to a specialty camera.

However, there are simply no modular consumer electronic devices in the market other than the proposed Google handsets. For example, there are no modular TV sets that allow insertion of a digital camera, a temperature sensor, or other custom parts into a flat-panel display. There are also no custom buildable Wi-Fi routers, which can be expanded to include a TV tuner, a cable-TV modem, or a wireless data modem connecting to a mobile carrier.

In fact, there is no fundamental difference between a modular TV set and a modular Wi-Fi router from a modular device point of view. Both are hybrid modular consumer devices. A TV set as a modular base can be inserted with a modular Wi-Fi router; a Wi-Fi router as a modular base can also be inserted with a modular TV set. In one aspect, both can be considered as a special case of a hybrid modular consumer appliance in the home or small office. However, such a generic and hybrid modular device simply does not exist today.

Therefore, there is a need for a hybrid modular and customizable consumer electronic device in the home of small office, which is not a wireless communicator.

BRIEF SUMMARY OF THE INVENTION

Aspects of the present invention relate to a plurality of hybrid modular consumer electronic devices, called hybrid modular devices (HMDs), wherein each said HMD comprises a base platform and a plurality of inserted snap-together functional modules so that the resulting assembly performs a custom-designed functionality.

In accordance with one aspect of the present invention, an HMD may not be a handheld device.

In accordance with one aspect of the present invention, the base platform of an HMD comprises at least a housing, or a physical platform, or a physical backplane, or a physical skeleton frame that provides the mechanical support for holding all the inserted modules of the HMD together, through mechanical constraints, with or without the help of magnetic force.

In accordance with one aspect of the present invention, the base platform of an HMD may be integrated with a plurality of component interconnect structures, which allow modular devices to be attached (inserted) to the base platform. Examples of interconnect structures include power strips, peripheral component expansion buses, audio or video input-output sockets, serial-bus or parallel-bus interfaces, etc.

Additionally in accordance with an embodiment of the present invention, an HMD base platform further comprises a computer, and an optional video subsystem. The computer acts as the controller of the component interconnect structures housed on the base platform. The computer may comprise CPUs (central processing units), GPUs (graphics processing units), memory, and a boot device. The optional video subsystem may be a physical device separate from the said computer, or be embedded in the said computer, housed on the HMD base platform.

Additionally in accordance with an embodiment of the present invention, physical modules that may be plugged into an HMD base platform may include, but are not restricted to the following list: computer system, Wi-Fi AP (access point), Wi-Fi terminal, wireless modem, wired-line modem, memory device (hard drive or solid-state drive), camera, speaker, tuner, DVR (digital video recorder), IoT (Internet-of-things) device, smart-home device, set-top box, display unit, sensor of all kinds, positioning device (such as GPS or global positioning system receiver), battery unit, game controller, antenna system, standalone consumer appliance, human interface device, etc.

BRIEF DESCRIPTION OF THE DRAWINGS

The above and other objects and features in accordance with the present invention will become apparent from the following descriptions of embodiments in conjunction with the accompanying drawings, and in which.

DETAILED DESCRIPTION OF EXEMPLARY EMBODIMENTS

Figure 1:
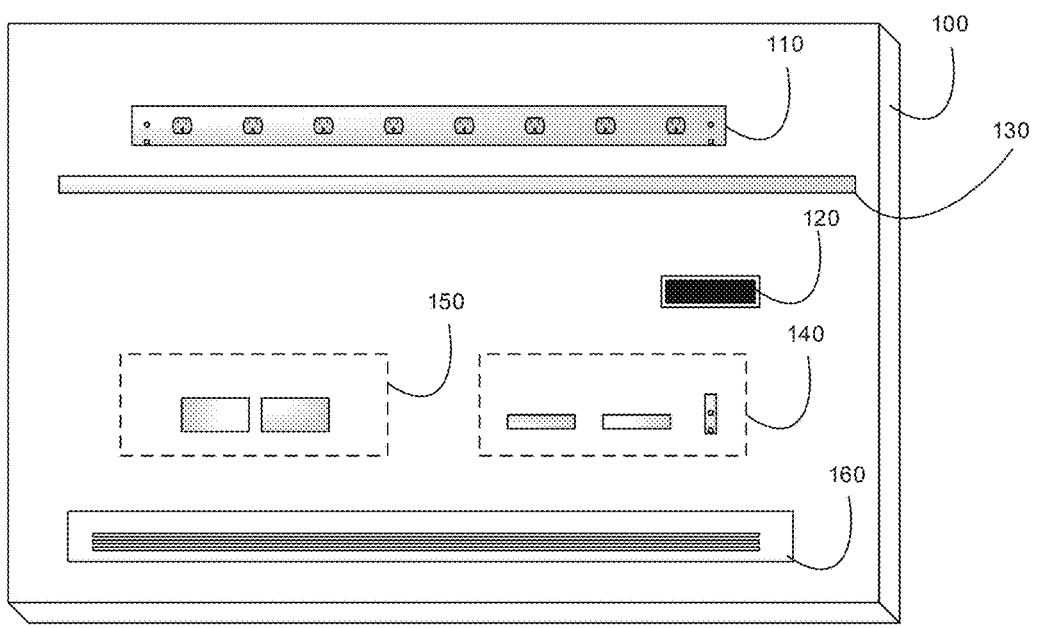
FIG. 1 is a simplified illustration that shows component-interconnect structures attached to the base platform of an HMD, in accordance with an embodiment of the present invention.

A system and apparatus to function as a hybrid modular appliance or electronic device, called a hybrid modular device (HMD), allows a user to plug a plurality of snap-together modules of different types into a base platform, so that the resulting assembly performs a custom-designed functionality.

For simplicity of description, the words "module" and "modular device" will be used interchangeably in the rest of the present specification.

In an HMD, the base platform is integrated with open-standard (or proprietary) interfaces. These interfaces allow the modules complying with open standards (or proprietary specifications) to be inserted (or plugged) into the base platform. As a result, the inserted modules function as integrated subsystems of the overall HMD. Any vendor is allowed to provide standards-complying (or proprietary) modular devices to be plugged into an HMD. Each pluggable module can be swapped out and replaced by an end user, without special tools or a static-free environment.

A major consideration for HMDs as commercial products is the tradeoff between volumetric efficiency in manufacturing, and the degree of customizability. The per-unit cost of manufacturing drops exponentially as the volume is expanded. However, as the volume is expanded, customizability of the product is also reduced.

Therefore, in accordance with one aspect of the present invention, the base platform of an HMD may, as an option, further comprise a fully functional and standalone consumer appliance. In accordance with an embodiment of the present invention, an HMD TV set is a fully standalone TV set with its own display unit, a TV core system, and perhaps a TV tuner. The HMD TV is different from an ordinary TV in that its bezel is integrated with additional racks or sockets that allow snap-together modules to be plugged into the frame of the TV.

In accordance with one aspect of the present invention, an HMD may comprise both modular and non-modular components. In accordance with an embodiment of the present invention, an HMD Wi-Fi router is a fully standalone Wi-Fi access point and router that allows additional modular components to be plugged into the frame of the router.

In accordance with one aspect of the present invention, an HMD may not be a handheld device.

In an HMD, the base platform comprises at least a physical frame or housing, which is integrated with component interconnect structures housed in the frame. These structures are exposed on an outside surface of the base platform so that external modules can be plugged into the base platform. Therefore, these component-connecting structures are also referred to as the external interconnect structures.

In accordance with one aspect of the present invention, the base platform of an HMD comprises at least a housing, or a physical platform, or a physical backplane, or a physical skeleton frame that provides the mechanical support for holding all the inserted modules of the HMD together, through mechanical constraints. Optionally, magnetic force is activated once a module device is snapped into a connector socket in the base platform.

In accordance with one aspect of the present invention, the external interconnect structures integrated in the base platform of an HMD may comprise power strips, peripheral component expansion buses, audio or video input/output structures, serial-bus interfaces, parallel-bus interfaces, etc.

In accordance with one aspect of the present invention, the base platform of an HMD may further comprise an internal data interconnect structure, which is coupled with the external interconnect structures, which are integrated into the base platform. The internal interconnect structure may comprise a system bus, or a switch fabric, or a combination thereof. An object of the internal interconnect structure is to provide data paths for various component subsystems of an HMD to communicate with one another.

In accordance with an embodiment of the current invention, as of this writing, the internal interconnect structure allows data transfer at a speed which is at least 10 Gb/s (gigabits per second).

In accordance with an embodiment of the present invention, as of this writing, the external component interconnect structures in an HMD may include the interfaces complying with the PCI (Peripheral Component Interconnect) series of standards, for example, PCIe (PCI Express); the interconnect structures may further include the interfaces complying with the HDMI (High-Definition Multimedia Interface) series of standards; the interconnect structures may further include the interfaces complying with the USB (universal serial bus) series of standards; the connect structures may further include the interfaces complying with the SATA (Serial Advanced Technology Attachment) series of standards for connecting a hard drive or an SSD (solid-state drive) to a computer; the interconnect structures may further include a display port (such as a mini DisplayPort or MDP).

In accordance with one aspect of the present invention, an HMD base platform further comprises a computer, and an optional video subsystem. The computer acts as the controller of both the internal data-interconnect structure and the external component interconnect structures housed on the base platform. The computer may comprise CPUs (central processing units), GPUs (graphics processing units), memory, and a boot device. The optional video subsystem may be a physical device separate from the said computer, or be embedded in the said computer, which is housed in the HMD base platform.

Additionally in accordance with an embodiment of the present invention, physical modules that may be plugged into an HMD base platform may include, but are not restricted to the following list: computer system, Wi-Fi AP (access point), Wi-Fi terminal, wireless modem, wired-line modem, memory device (hard-drive or solid state device), camera, speaker, tuner, DVR (digital video recorder), IoT (Internet-of-things) device, smart-home device, set-top box, display unit, sensor of all kinds, positioning device, game controller, antenna system, standalone consumer electronic appliance, human interface device (HID), etc.

In accordance with one aspect of the present invention, HMDs can be classified into generic and non-generic HMDs. A non-generic HMD is one that the base platform comprises a standalone consumer appliance. In accordance with one aspect of the present invention, hybrid TVs form a major class of non-generic HMDs—the base platform of a hybrid HMD TV further comprises a TV set. In accordance with another aspect of the present invention, hybrid Wi-Fi APs form another major class of non-generic HMDs—the base platform of a hybrid HMD Wi-Fi AP further comprises a Wi-Fi AP.

One exemplary embodiment of an HMD is an HMD TV-Router: this is an HMD with a TV set as the base platform, with a modular Wi-Fi router unit pluggable into the display or base of the TV set.

Another exemplary embodiment of an HMD is an HMD TV-DVR-Router: this is an HMD with a TV set as the base platform, with a modular Wi-Fi router unit, a modular DVR unit, both pluggable into the display or the base of the TV set.

Yet another exemplary embodiment of an HMD is an HMD TV-router-storage: this is an HMD with a TV set as the base platform, with a modular Wi-Fi router unit, a modular network-attached storage (NAS) server unit, both pluggable into the display or the base of the TV set.

Yet another exemplary embodiment of an HMD is an HMD router-DVR-storage: this is an HMD with a Wi-Fi router as the base platform, with a modular network DVR unit, a modular NAS server unit, a modular Cable-TV modem unit, a modular mobile data modem unit, a modular fixed broadband data modem unit, a modular display unit, a modular keyboard unit, a modular Internet acceleration unit, all pluggable into the frame of the router base.

In yet another exemplary embodiment, an HMD TV set is used as a transformer. In the living room, an HMD TV set is configured as a home theater unit, while another HMD TV is configured as a videoconferencing device in the home office, and yet another HMD TV is set up as a music jukebox in the den.

In all these embodiments, the choices are not limiting. The number of attached (plugged or inserted) modules is also not limiting.

Reference is now made to FIG. 1, which is a simplified illustration showing the external component interconnect structures integrated within the base platform of an HMD, in accordance with an embodiment of the present invention. The surface of a base platform 100 contains a power strip 110, a PCIe (PCI Express) interface bus 160, a number of HDMI sockets 150, and a number of USB sockets 140, a SMARC (smart mobility architecture) card socket 120, and another serial bus 130.

Figure 2:
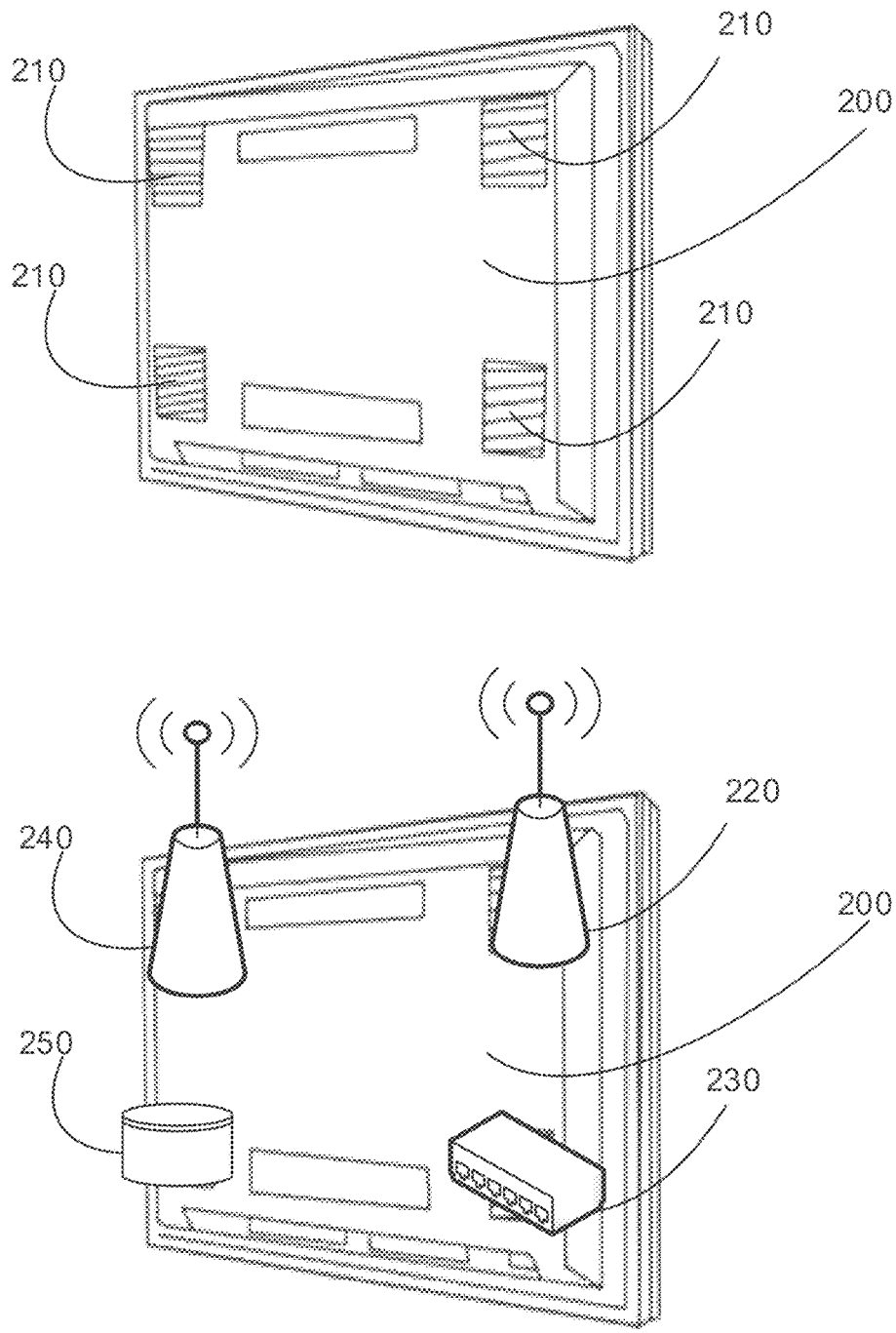
FIG. 2 is a simplified illustration of an HMD, which is a hybrid TV set with a Wi-Fi router and computer storage, in accordance with an embodiment of the present invention.

FIG. 2 is a simplified illustration of an HMD 200, which is a hybrid TV set with 4 plugged module devices. In the figure, the backside of a TV display unit is employed as the base platform. In the top half of FIG. 2, 4 slots 210 for inserting modular devices are shown. In the bottom half of FIG. 2, a modular Wi-Fi AP 220, a modular wireless modem 240, a modular storage device 250, and a modular NAS server unit 230 are plugged into the HMD TV set 200.

Figure 3:
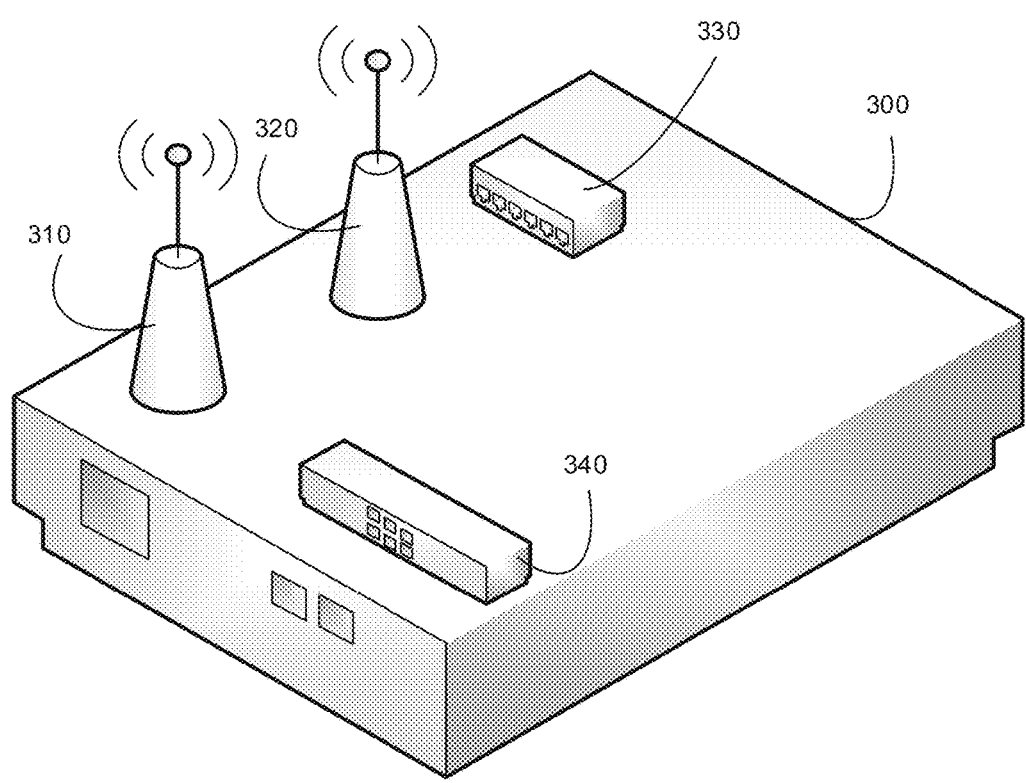
FIG. 3 is a simplified illustration of an HMD, which is a hybrid Wi-Fi router with multiple modems and a server computer, in accordance with an embodiment of the present invention.

FIG. 3 is a simplified illustration of an HMD 300, which is a hybrid Wi-Fi router with multiple modems and a server computer, in accordance with an embodiment of the present invention. A modular wireless modem 310 connecting to a mobile data operator, another modular wireless (Bluetooth) modem 320, a modular wired-line broadband modem 330, and a modular server computer 340, are plugged into the base platform (the top side) of the HMD Wi-Fi router 300.

In the foregoing specification, the invention has been described with reference to specific exemplary embodiments thereof It will, however, be evident that various modification and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A reconfigurable hybrid TV set comprising:
   a base device;
   a TV core system integrated into the base device, wherein the core system supports a TV set without being a display screen and/or TV tuner;
   a plurality of component modules, each of said module attachable on a surface of the base device, each said module becoming a module subsystem of the hybrid device upon attachment to the base device, wherein said attachable modules include a device that accelerates Internet traffic through the hybrid TV set;
   a plurality of module interconnect structures integrated into the base device, each said module interconnect structure allowing a number of said modules to be snapped onto or plugged into the module interconnect structure;
   a data interconnect structure integrated into the base device, the data interconnect structure coupled with the plurality of module interconnect structures; and
   a computing unit comprising at least a CPU (central processing unit) or a GPU (graphics processing unit), and a memory unit, wherein
   the computing unit is integrated into the base device, and is configured to control all data communication between any 2 of the module subsystems, and between the base device and any of the module subsystems.

2. A reconfigurable hybrid TV box comprising:
   a base device;
   a TV box system integrated into the base device, wherein the TV box supports streaming movies or TV shows from a service to a TV set;
   a plurality of component modules, each of said module attachable on a surface of the base device, each said module becoming a module subsystem of the hybrid device upon attachment to the base device, wherein said attachable modules include a device that accelerates Internet traffic through the hybrid TV box;
   a plurality of module interconnect structures integrated into the base device, each said module interconnect structure allowing a number of said modules to be snapped onto or plugged into the module interconnect structure;
   a data interconnect structure integrated into the base device, the data interconnect structure coupled with the plurality of module interconnect structures; and
   a computing unit comprising at least a CPU or a GPU, and a memory unit, wherein
   the computing unit is integrated into the base device, and is configured to control all data communication between any 2 of the module subsystems, and between the base device and any of the module subsystem.

* * * * *